United States Patent
Lee et al.

(10) Patent No.: US 11,012,419 B2
(45) Date of Patent: May 18, 2021

(54) SYSTEMS AND METHODS FOR MANAGEMENT OF SOFTWARE CONNECTIONS

(71) Applicant: Quanta Computer Inc., Taoyuan (TW)

(72) Inventors: Chen-Chung Lee, Taoyuan (TW); Chia-Hung Lin, Taoyuan (TW); Cheng-Yao Wang, Taoyuan (TW); Jen-Hung Chang, Taoyuan (TW); Ming-Jen Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 262 days.

(21) Appl. No.: 16/357,515

(22) Filed: Mar. 19, 2019

(65) Prior Publication Data

US 2020/0169537 A1    May 28, 2020

(30) Foreign Application Priority Data

Nov. 27, 2018    (TW) ................................. 107142171

(51) Int. Cl.
*H04L 29/06* (2006.01)

(52) U.S. Cl.
CPC ...... *H04L 63/0281* (2013.01); *H04L 63/0236* (2013.01)

(58) Field of Classification Search
CPC .......................... H04L 63/0281; H04L 63/0236
See application file for complete search history.

(56) References Cited

U.S. PATENT DOCUMENTS

| | | | | |
|---|---|---|---|---|
| 9,043,894 | B1 * | 5/2015 | Dennison | H04L 63/1408 726/11 |
| 9,660,998 | B1 * | 5/2017 | Sethi | H04L 61/1511 |
| 2002/0143939 | A1 * | 10/2002 | Riddle | H04L 29/06 709/224 |
| 2007/0233877 | A1 * | 10/2007 | Qu | H04L 61/2517 709/227 |
| 2015/0215177 | A1 * | 7/2015 | Pietrowicz | H04W 24/10 370/230 |
| 2016/0050224 | A1 * | 2/2016 | Ricafort | H04L 61/2007 726/23 |
| 2016/0188512 | A1 * | 6/2016 | Lin | G06F 13/364 710/110 |
| 2018/0183827 | A1 * | 6/2018 | Zorlular | H04L 63/1416 |

* cited by examiner

*Primary Examiner* — Vance M Little
(74) *Attorney, Agent, or Firm* — McClure, Qualey & Rodack, LLP

(57) ABSTRACT

A system including a network communication device, a storage device, and a controller is provided. The storage device stores first mappings between IP addresses and devices, and second mappings between software and devices. The controller obtains a connection log from the proxy server or the firewall device via the network communication device, uses the first mappings and the second mappings to analyze the connection log to determine one or more different connections between connections of devices on which first software is installed and connections of devices on which the first software is not installed, determines whether the first software functions normally on a first device blocking the different connections, and adds destination addresses of the different connections into a blocking list in response to the first software functioning normally on the first device, such that the proxy server or the firewall device blocks all connections towards the destination addresses.

10 Claims, 6 Drawing Sheets

SYSTEMS AND METHODS FOR MANAGEMENT OF SOFTWARE CONNECTIONS

CROSS REFERENCE TO RELATED APPLICATIONS

This Application claims priority of Taiwan Application No. 107142171, filed on Nov. 27, 2018, the entirety of which is incorporated by reference herein.

BACKGROUND OF THE APPLICATION

Field of the Application

The application generally relates to management of information security and, more particularly, to systems and methods for management of software connections, which may prevent software used by a corporation from leaking confidential information (e.g., personal information and software usage logs) to persons outside of the corporation.

Description of the Related Art

With rapid development of computer technologies, various kinds of software have been commonly used to provide automatic services in our daily lives. In particular, the software applications are extended further to bring about mobile computing through ubiquitous networks. However, in some cases, information leakage may result because some software may send confidential information, such as personal information and software usage logs, to the Internet without the user's authorization. For example, the users of some software may not be aware of the fact that the software usage logs are secretly recorded by the software and then sent to an unknown server on the Internet. The problems of such unauthorized information leakage are that the users do not know exactly what kind of information is being leaked, and it's hard for users to stem this information leakage. Alternatively, some office software used within a corporation may randomly connect to remote servers to verify the software authorization (this authorization mechanism is also called network licensing), without the corporation knowing if any of the corporation's confidential information is being leaked during this process of network licensing. As a result, the corporation may have to bear the unnecessary risk of information leakage.

BRIEF SUMMARY OF THE APPLICATION

In order to solve the aforementioned problems, the present application proposes systems and methods for management of software connections, in which the connection log, mappings between devices and MAC/IP addresses, and mappings between devices and software are analyzed to determine the target connections for blocking tests. If the software functions normally when the target connections are blocked, the destination addresses of the target connections may be added to the block list, thereby preventing the software from leaking confidential information.

In one aspect of the application, a system comprising a network communication device, a storage device, and a controller is provided. The network communication device is configured to provide a network connection to at least a proxy server or a firewall device. The storage device is configured to store first mappings between Internet Protocol (IP) addresses and devices, and second mappings between software and devices. The controller is configured to obtain a connection log from the proxy server or the firewall device via the network communication device, use the first mappings and the second mappings to analyze the connection log to determine one or more different connections between connections of devices on which first software is installed and connections of devices on which the first software is not installed, determine whether the first software functions normally on a first device blocking the different connections, and add destination addresses of the different connections into a blocking list in response to the first software functioning normally on the first device, such that the proxy server or the firewall device blocks all connections towards the destination addresses.

In another aspect of the application, a method, executed by a controller of a system connected to a proxy server or a firewall device, is provided. The method comprises the steps of: obtaining a connection log from the proxy server or the firewall device; using the first mappings and the second mappings to analyze the connection log to determine one or more different connections between connections of devices on which first software is installed and connections of devices on which the first software is not installed; determining whether the first software functions normally on a first device blocking the different connections; and adding destination addresses of the different connections into a blocking list in response to the first software functioning normally on the first device, such that the proxy server or the firewall device blocks all connections towards the destination addresses.

Other aspects and features of the present application will become apparent to those with ordinarily skill in the art upon review of the following descriptions of specific embodiments of the systems and the methods for management of software connections.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
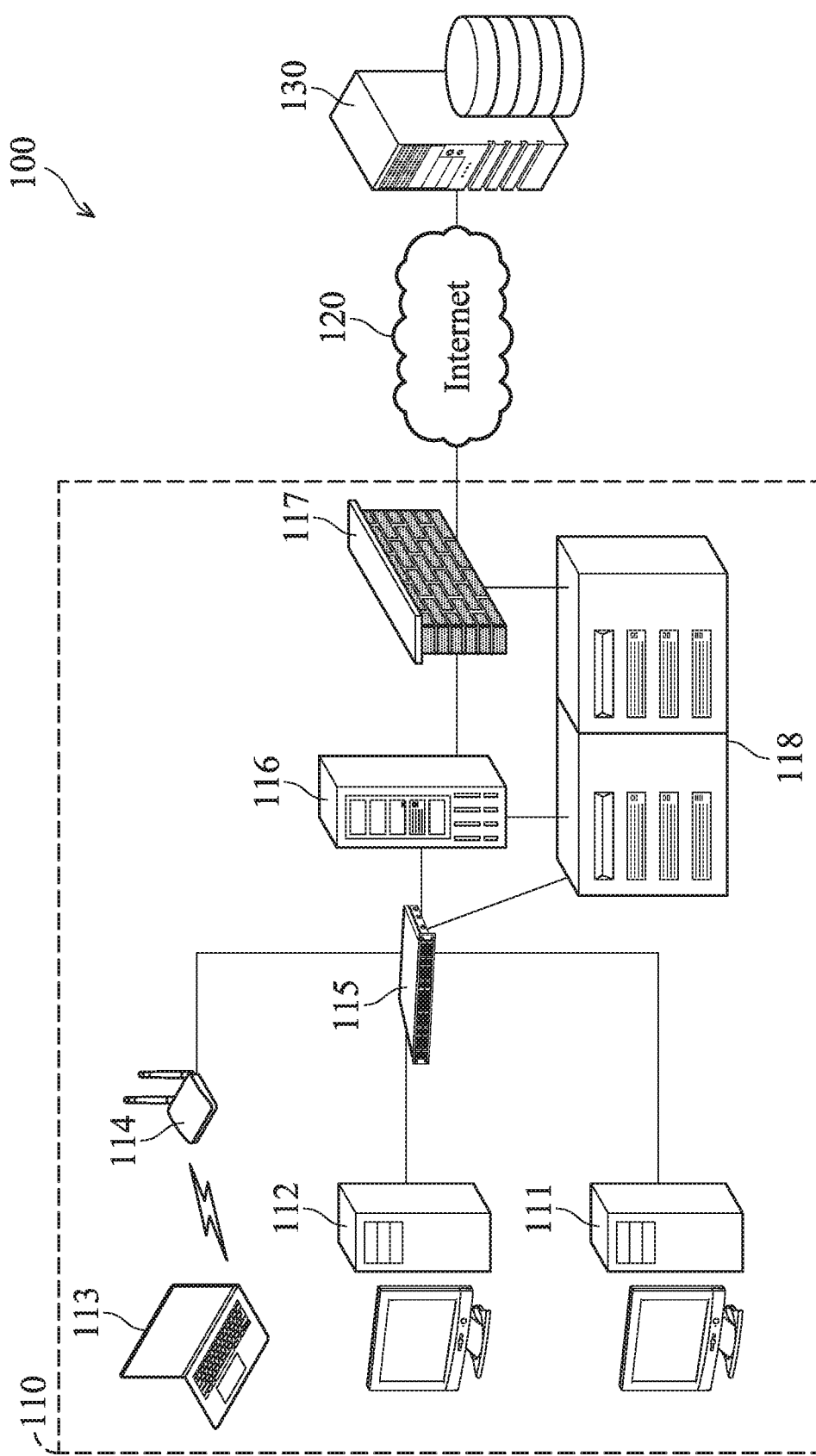
FIG. 1 is a block diagram of a network environment according to an embodiment of the application.

FIG. 1 is a block diagram of a network environment according to an embodiment of the application.

As shown in FIG. 1, the network environment 100 may include a local network 110, the Internet 120, and a remote server 130. The local network 110 may be a corporate network or an office network, and it may include multiple terminal devices 111 to 113, a wireless Access Point (AP) 114, a switch 115, a proxy server 116, a firewall device 117, and a system 118 for management of software connections.

Each of the terminal devices 111 to 113 may be any computing device with a network communication function, such as a laptop computer, a desktop computer, a smartphone, a panel Personal Computer (PC), or a server. For example, as shown in FIG. 1, the terminal devices 111 and 112 may be desktop computers connected to the corporate network via wired connections, such as Ethernet connections, optical network connections, Asymmetric Digital Subscriber Line (ADSL) connections, Twisted Pair connections, or Coaxial cable connections, while the terminal device 113 may be a laptop computer connected to the corporate network via the wireless AP 114.

In particular, each of the terminal devices 111 to 113 may be installed with the same or different software, wherein some of the installed software may send data (e.g., confidential information of a corporation or user) to a server (e.g., the remote server 130) outside the local network 110 without the corporation's or user's authorization, and such data connections are the target connections to be managed as proposed in the present application.

The wireless AP 114 may utilize any wireless communication technology, such as the Wireless-Fidelity (Wi-Fi) technology, the Bluetooth technology, or the Zigbee technology, to establish a Wireless Local Area Network (WLAN) to provide wireless services to any terminal device (e.g., the terminal device 113) within the coverage of the WLAN. The wireless AP 114 may connect to the switch 115 via an Ethernet connection. The wireless AP 114 typically receives, buffers, and transmits data from and to any terminal device (e.g., the terminal device 113) within the coverage of the WLAN.

The switch 115 may include multiple ports, through which the terminal devices 111 to 113 may be connected to realize device-to-device communications within the local network 110. In particular, the switch 115 may keep a mapping table storing the mappings between the terminal devices 111 to 113 and their Media Access Control (MAC) or Internet Protocol (IP) addresses. Alternatively, the switch 115 may store the device-to-address mapping table in a database (not shown).

The proxy server 116 is responsible for providing indirect connections between the internal devices (e.g., the terminal devices 111 to 113 in the local network 110) and the external devices (e.g., the remote server 130), so as to keep the privacy and security of the internal devices. In other words, devices external to the local network 110 only know the existence of the proxy server 116 and can only access the proxy server 116 but not the terminal devices 111 to 113. In addition, the proxy server 116 may keep a connection log for recording the information of all connections, including connections from inside the local network 110 towards outside the local network 110.

The firewall device 117 may be a network security device for monitoring the traffic in and out of the local network 110, and may be configured to allow or block certain traffic according to the rules specified by the Management Information System (MIS) personnel or the blocking/monitoring list provided by the system 118.

The system 118 may be a server or any computing device with a network communication function, which is responsible for managing the connections of the software on the terminal devices 111 to 113 towards the outside of the local network 110, so as to prevent the software on the terminal devices 111 to 113 from leaking confidential information (e.g., personal information and software usage logs).

In one embodiment, the system 118 may further maintain the software master data of the corporation, which may include the mappings between devices and software (such mappings may be maintained in a device-to-software mapping table) and the periods of time that the software functions on the devices.

In another embodiment, the software master data of the corporation may be stored in a database (not shown) external to the system 118, and the system 118 may read the software master data from the database when the system 118 needs the software master data for performing the method for management of software connections.

The remote server 130 may be any server disposed on the Internet 120. In particular, the software installed on the terminal devices 111 to 113 may connect to the remote server 130 for data communications (e.g., for network licensing). For example, the remote server 130 may be a server set up by the software development company of the software installed on the terminal devices 111 to 113, and the remote server 130 may receive user information, software usage logs, and/or other information related to the corporation, in which the terminal devices 111 to 113 are disposed, from the software on the terminal devices 111 to 113.

It should be noted that the network environment 100 depicted in FIG. 1 is for illustrative purposes only and is not intended to limit the scope of the application. For example, the proxy server 116 and the firewall device 117 may be incorporated into a single device, such as a device supporting both the firewall function and the proxy function. Alternatively, the local network 110 may include only one of the proxy server 116 and the firewall device 117.

Figure 2:
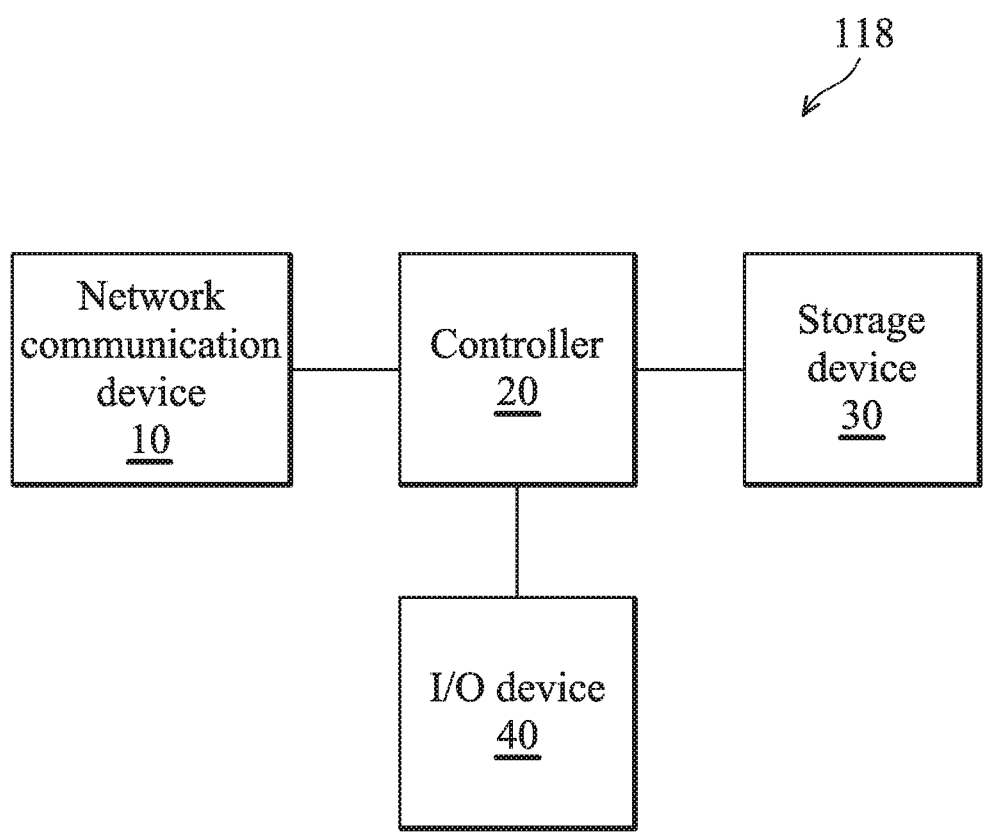
FIG. 2 is a block diagram illustrating an exemplary hardware architecture of the system 118 according to an embodiment of the application.

FIG. 2 is a block diagram illustrating an exemplary hardware architecture of the system 118 according to an embodiment of the application.

As shown in FIG. 2, the system 118 may include a network communication device 10, a controller 20, a storage device 30, and an Input/Output (I/O) device 40.

The network communication device 10 is responsible for providing network connections to the other devices (e.g., the switch 115, the proxy server 116, and/or the firewall device 117) in the local network 110. The network communication device 10 may provide wired connections using at least one wired communication technology, such as the Ethernet technology, the ADSL technology, the optical network technology, the twisted-pair network technology, or the coaxial cable network technology, and/or provide wireless connections using at least one wireless communication technology, such as the Wi-Fi technology, the Bluetooth technology, or the Zigbee technology.

The controller 20 may be a general-purpose processor, a Micro Control Unit (MCU), an Application Processor (AP), or a Digital Signal Processor (DSP), which includes various circuits for performing the functions of data processing and computing, controlling the network communication device 10 to provide network connections to the other devices in the local network 110, reading or storing data from or to the storage device 30, and receiving user input or outputting feedback signals to users (e.g., the MIS personnel) via the I/O device 40.

In particular, the controller 20 coordinates the operations of the network communication device 10, the storage device 30, and the I/O device 40, to carry out the method for management of software connections.

As will be appreciated by persons skilled in the art, the circuits in the controller 20 will typically comprise transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory computer-readable storage medium, such as a Random Access Memory (RAM), or a FLASH memory, or a magnetic storage device, such as a hard disk or a magnetic tape, or an optical disc, or any combination thereof for storing software master data and instructions or program code of applications and/or communication protocols.

In particular, the storage device 30 stores instructions or program code of the method for management of software connections, which are/is loaded and executed by the controller 20.

The I/O device 40 may include one or more buttons, a keyboard, a mouse, a touch pad, a video camera, a microphone, and/or a speaker, etc., serving as an Man-Machine Interface (MMI) for interaction with users (e.g., the MIS personnel).

It should be understood that the components described in the embodiment of FIG. 2 are for illustrative purposes only and are not intended to limit the scope of the application. For example, the system 118 may include more components, such as a power supply, and/or a display device (e.g., a Liquid-Crystal Display (LCD), Light-Emitting Diode (LED) display, or Electronic Paper Display (EPD), etc.). The power supply may be a portable/replaceable battery providing power to all the other components of the system 118. The display may provide a display function for displaying visual content (e.g., texts or images).

Figure 3:
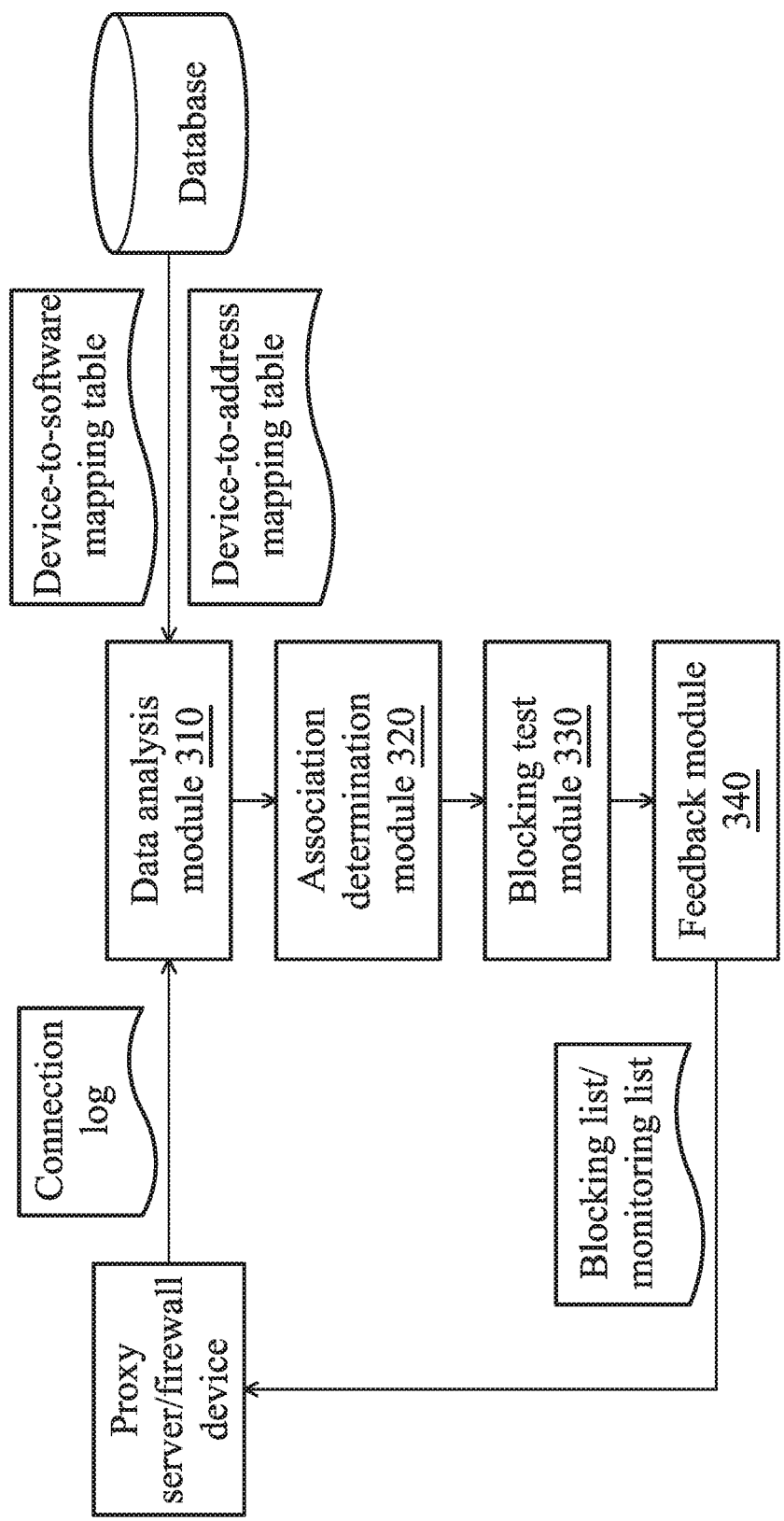
FIG. 3 is a block diagram illustrating an exemplary software architecture of the method for management of software connections according to an embodiment of the application.

FIG. 3 is a block diagram illustrating an exemplary software architecture of the method for management of software connections according to an embodiment of the application.

In this embodiment, the method for management of software connections is applied to the system 118. Specifically, the method for management of software connections may be implemented in program codes as multiple software modules which may be loaded and executed by the controller 20.

As shown in FIG. 3, the software architecture includes a data analysis module 310, an association determination module 320, a blocking test module 330, and a feedback module 340.

The data analysis module 310 is responsible for obtaining from the proxy server 116 and/or the firewall device 117 the log of connections (also called connection log) from the terminal devices 111~113 towards outside the local network 110, and obtaining the device-to-address mapping table and the device-to-software mapping table. Also, the data analysis module 310 is responsible for using the device-to-address mapping table and the device-to-software mapping table to analyze the connection log to determine one or more different connections between connections of devices on which the target software is installed and connections of devices on which the target software is not installed.

Specifically, the software in the software master data may be selected one at a time to be the target software for the analysis of the connection log.

In another embodiment, a test device on which only the target software is installed may be set up in a lab environment, and the connections generated during the functioning of the target software on the test device are logged and also referred to control connections. The data analysis module 310 may include the control connections in the different connections and leave them to other modules for subsequent processing.

In another embodiment, the device-to-software mapping table may record the periods of time that the software (including the target software) functions on the devices, in addition to the mappings between devices and software. The data analysis module 310 may further exclude, from the different connections, connections which are not logged during the periods of time that the target software functions on the devices.

The association determination module 320 is responsible for checking on each of the different connections to determine whether the respective one of the different connections is associated with the target software. For the different connections associated with the target software, the blocking test module 330 may perform a blocking test on each of such connections. For the different connections not associated with the target software, the association determination module 320 may not include such connections in the blocking list nor the monitoring list.

In one embodiment, the association determination module 320 may check on each of the destination addresses of the different connections to see if the respective one of the different connections is associated with the software development company of the target software. For example, the destination address of a different connection may be represented by a Uniform Resource Locator (URL), and the different connection may be determined to be associated with the target software if the URL includes the name of the software development company of the target software. Alternatively, the destination address of a different connection may be represented by an IP address, and the different connection may be determined to be associated with the target software if the domain name corresponding to the IP address includes the name of the software development company of the target software.

The blocking test module 330 is responsible for performing a blocking test on each of the different connections received from the association determination module 320. Specifically, a test device on which only the target software is installed may be set up in a lab environment, and the blocking test module 330 may block a different connection to see if the target software functions normally. If the target software functions normally when the different connection is blocked, the blocking test module 330 may add the destination address of this different connection into the blocking list. Otherwise, if the target software does not function normally when the different connection is blocked, it means that blocking this different connection may cause dysfunction of the target software, and the blocking test module 330 may add the destination address of this different connection into the monitoring list.

The feedback module 340 is responsible for updating the blocking list or the monitoring list to the proxy server 116 and/or the firewall device 117, such that the proxy server 116 and/or the firewall device 117 may block or monitor all connections towards the destination addresses in the blocking list or in the monitoring list.

Specifically, by blocking the connections, it means that any connection attempt from inside the local network 110 towards any one of the destination addresses in the blocking list will be blocked. By monitoring the connections, it means that any connection attempt from inside the local network 110 towards any one of the destination addresses in the monitoring list will be monitored (i.e. the information of such connections will be logged for further investigation).

Figure 4A:
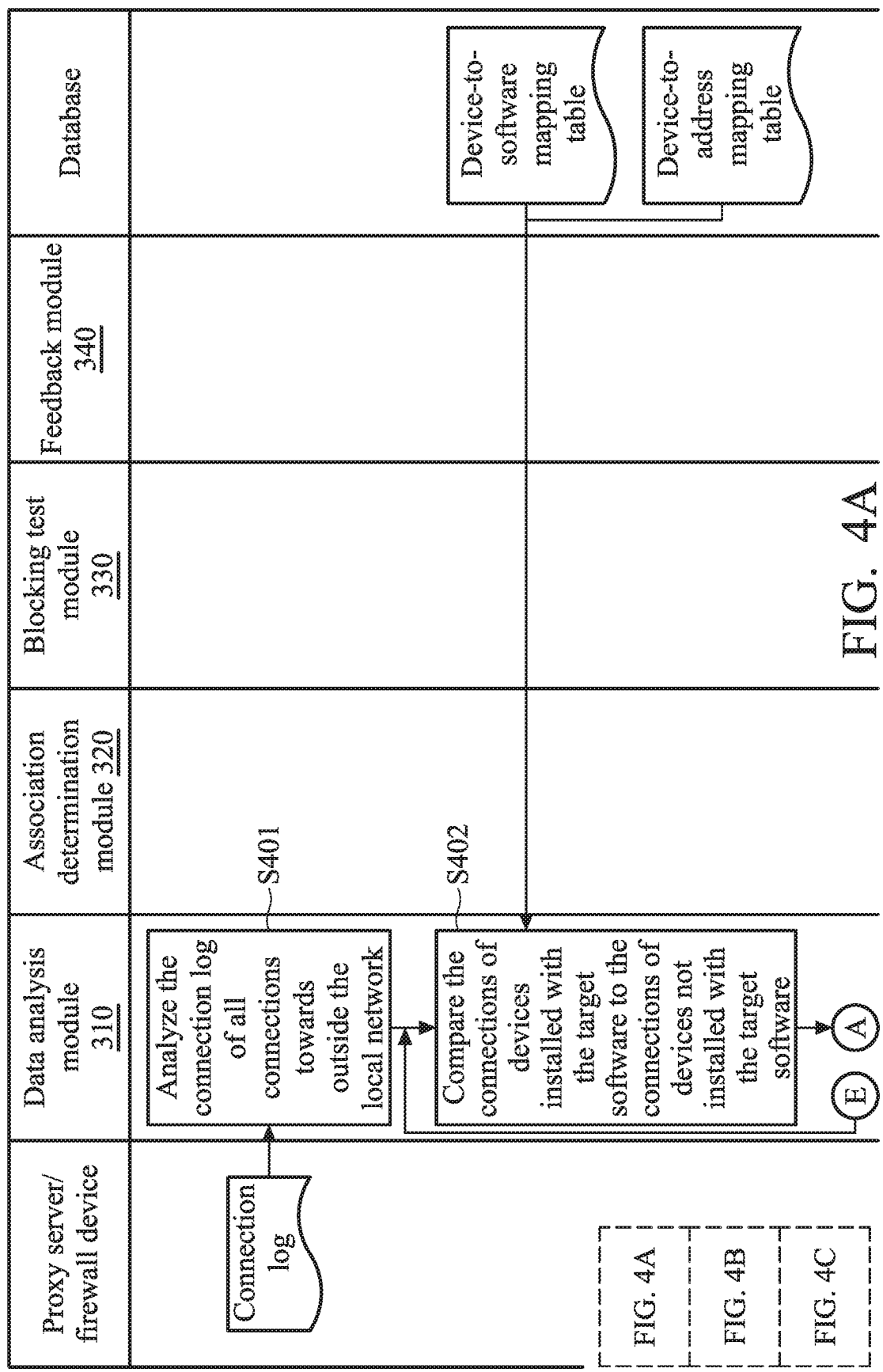
FIGS. 4A to 4C show a flow chart of the method for management of software connections according to an embodiment of the application.
Figure 4B:
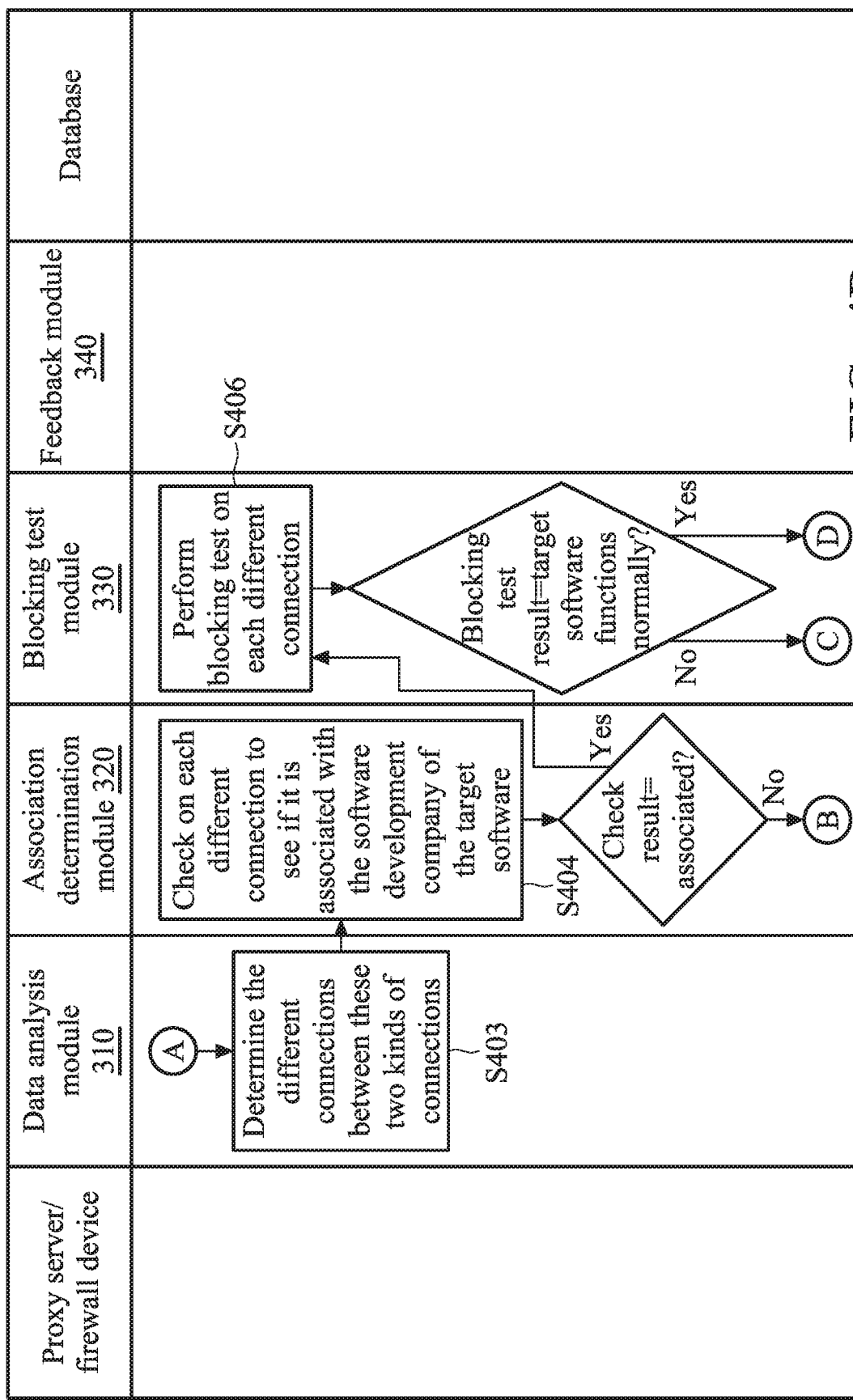
Figure 4C:
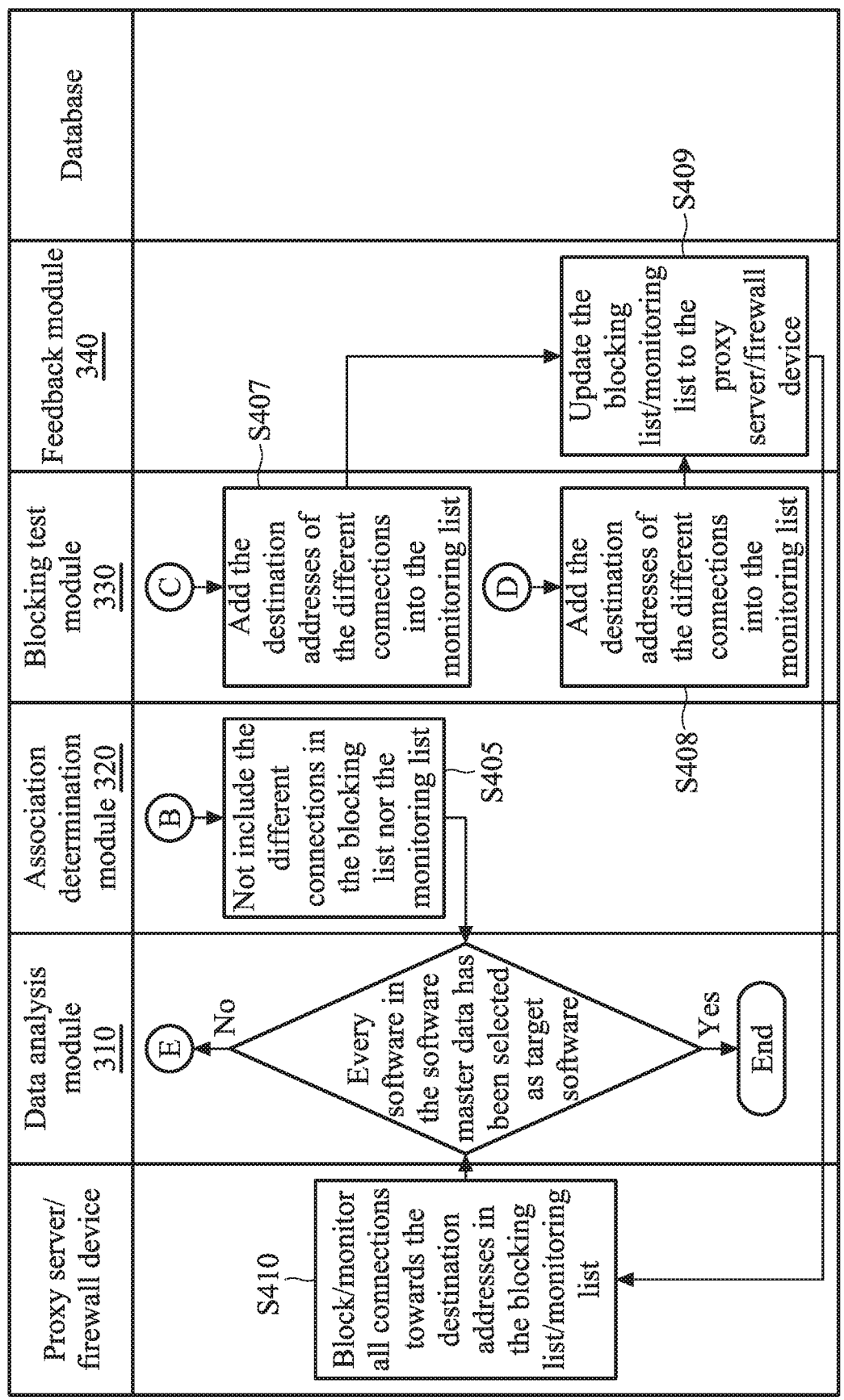

FIGS. 4A to 4C show a flow chart of the method for management of software connections according to an embodiment of the application.

To begin with, the data analysis module 310 analyzes the connection log of all connections towards outside the local network 110 (step S401), and then selects target software among the software in the software master data and obtains the devices and periods of time associated with the target software from the database. After that, the data analysis module 310 compare the connections of devices on which the target software is installed to the connections of devices on which the target software is not installed (step S402), and then determines the different connections between these two kinds of connections (step S403).

Next, the association determination module 320 checks on each of the different connections to determine whether the respective one of the different connections is associated with the software development company of the target software (step S404). For the different connections not associated with the software development company of the target software, the association determination module 320 does not include such different connections in the blocking list nor the monitoring list (step S405). For the different connections associated with the software development company of the target software, the blocking test module 330 performs a blocking test on each of these different connections (step S406).

If the result of the blocking test shows that the target software does not function normally when the different connection are blocked, the blocking test module 330 adds the destination addresses of the different connections into the monitoring list (step S407). Otherwise, if the result of the blocking test shows that the target software functions normally when the different connections are blocked, the blocking test module 330 adds the destination addresses of the different connections into the blocking list (step S408).

Subsequent to steps S407 and S408, the feedback module 340 updates the blocking list and/or the monitoring list to the proxy server 116 and/or the firewall device 117 (step S409), such that the proxy server 116 and/or the firewall device 117 may block or monitor all connections towards the destination addresses in the blocking list or the monitoring list (step S410).

Subsequent to steps S405 and S410, if every software in the software master data has been selected as target software, the method ends. Otherwise, if there is software that has not been selected as target software, the method returns to step S402.

In view of the forgoing embodiments, it will be appreciated that the systems and methods for management of software connections are characterized in that the connection log, the device-to-address mapping table, and the device-to-software mapping table are analyzed to determine the target connections for blocking tests. If the software functions normally when the target connections are blocked, the destination addresses of the target connections may be added to the block list, thereby preventing the software from leaking confidential information.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A system, comprising:
a network communication device, configured to provide a network connection to at least a proxy server or a firewall device;
a storage device, configured to store first mappings between Internet Protocol (IP) addresses and devices, and second mappings between software and devices; and
a controller, configured to obtain a connection log from the proxy server or the firewall device via the network communication device, use the first mappings and the second mappings to analyze the connection log to determine one or more different connections between connections of devices on which first software is installed and connections of devices on which the first software is not installed, determine whether the first software functions normally on a first device blocking the different connections, and add destination addresses of the different connections into a blocking list in response to the first software functioning normally on the first device, such that the proxy server or the firewall device blocks all connections towards the destination addresses.

2. The system of claim 1, wherein the controller is further configured to add the destination addresses into a monitoring list in response to the first software not functioning normally on the first device, such that the proxy server or the firewall device monitors all connections towards the destination addresses.

3. The system of claim 1, wherein the controller is further configured to determine whether the different connections are associated with the first software, and the determining of whether the first software functions normally on the first device blocking the different connections is performed in response to the different connections being associated with the first software.

4. The system of claim 1, wherein the controller is further configured to obtain information of a second connection from a second device on which only the first software is installed, and include the second connection in the different connections.

5. The system of claim 1, wherein the first mappings further include periods of time in which the first software functions on the devices, and the controller is further configured to exclude, from the different connections, connections which are not logged during the periods of time, prior to determining whether the first software functions normally on the first device blocking the different connections.

6. A method, executed by a controller of a system connected to a proxy server or a firewall device, comprising:
   obtaining a connection log from the proxy server or the firewall device;
   obtaining first mappings and second mappings, wherein the first mappings are mappings between devices and Internet Protocol (IP) or Media Access Control (MAC) addresses, and the second mappings are mappings between software and devices;
   using the first mappings and the second mappings to analyze the connection log to determine one or more different connections between connections of devices on which first software is installed and connections of devices on which the first software is not installed;
   determining whether the first software functions normally on a first device blocking the different connections; and
   adding destination addresses of the different connections into a blocking list in response to the first software functioning normally on the first device, such that the proxy server or the firewall device blocks all connections towards the destination addresses.

7. The method of claim 6, further comprising:
   adding the destination addresses into a monitoring list in response to the first software not functioning normally on the first device, such that the proxy server or the firewall device monitors all connections towards the destination addresses.

8. The method of claim 6, further comprising:
   determining whether the different connections are associated with the first software;
   wherein the determining of whether the first software functions normally on the first device blocking the different connections is performed in response to the different connections being associated with the first software.

9. The method of claim 6, further comprising:
   obtaining information of a second connection from a second device on which only the first software is installed; and
   including the second connection in the different connections.

10. The method of claim 6, wherein the first mappings further include periods of time in which the first software functions on the devices, and the method further comprises:
   excluding connections which are not logged during the periods of time from the different connections, prior to determining whether the first software functions normally on the first device blocking the different connections.

* * * * *